(12) United States Patent
Takimoto et al.

(10) Patent No.: US 6,706,440 B1
(45) Date of Patent: Mar. 16, 2004

(54) APPARATUS AND METHOD FOR INJECTING LIQUID INTO CONTAINER

(75) Inventors: Kiyohide Takimoto, Utsunomiya (JP); Yuichi Maekawa, Utsunomiya (JP)

(73) Assignee: NEC Mobile Energy Corporation, Utsunomiya (JP)

( * ) Notice: Subject to any disclaimer, the term of this patent is extended or adjusted under 35 U.S.C. 154(b) by 123 days.

(21) Appl. No.: 09/698,092

(22) Filed: Oct. 30, 2000

(30) Foreign Application Priority Data

Oct. 29, 1999 (JP) .......................................... 11-308799

(51) Int. Cl.$^7$ ........................ H01M 2/36; H01M 10/40; B67D 5/00
(52) U.S. Cl. .............................. 429/52; 429/50; 429/72; 429/80; 141/8; 141/61; 141/241
(58) Field of Search ............................ 141/61, 241, 8; 429/80, 72, 50, 52

(56) References Cited

U.S. PATENT DOCUMENTS 3,282,306 A * 11/1966 Greenhut 4,713,925 A * 12/1987 Kafkis

* cited by examiner

Primary Examiner—John S. Maples
(74) Attorney, Agent, or Firm—Westerman, Hattori, Daniels & Adrian, LLP

(57) ABSTRACT

The present invention provides a liquid injection apparatus for injecting liquid into a container, comprising an injection chamber, a container for a liquid to be injected and entirely sealed except an injection port is placed in the injection chamber with the injection port directed to the bottom, an injection cell comprising at least one unit injection cell to accommodate the liquid to be injected is installed in the injection chamber, there is provided pressure regulating means to reduce the pressure in the injection chamber and to regulate pressure in the injection chamber to the atmospheric pressure or to a level higher than the atmospheric pressure, the pressure in the injection chamber is reduced to a level lower than the atmospheric pressure by the pressure regulating means at least once, and then, by maintaining the atmospheric pressure or the pressure higher than the atmospheric pressure, the liquid is injected through the injection port.

7 Claims, 6 Drawing Sheets

(A)

(B)

APPARATUS AND METHOD FOR INJECTING LIQUID INTO CONTAINER

BACKGROUND OF THE INVENTION

The present invention relates to an apparatus and a method for injecting liquid into a container which is entirely sealed except for an injection port. Also, the invention relates to an apparatus and a method for efficiently injecting electrolyte through an inlet in a top cover after the top cover has been attached to a battery case where a battery element is accommodated. In particular, the invention relates to an apparatus and a method for injecting electrolyte suitable for the injection of electrolyte into a nonaqueous electrolyte battery such as a lithium ion battery.

In various fields of industrial and other applications, it is generally practiced to inject liquid into a container which is entirely sealed except for an injection port. For instance, in a lithium ion battery used as a power source for small size electronic devices, active components are coated on a positive electrode current collector and a negative electrode current collector to prepare a positive electrode and a negative electrode respectively. These electrodes are put together with a separator interposed between them and these are wound up to form a battery element. After the battery element is accommodated in a battery case, the battery case is entirely sealed except for an injection port for electrolyte, and then, the electrolyte is injected through the injection port.

FIG. 7 shows the drawings to explain injection process in the assembling procedure of a battery.

As shown in FIG. 7(A), a battery element is accommodated in a battery case 51. A top cover 54 is mounted on the top opening of the battery case 51 by means, such as laser welding, and this top cover comprises a electrolyte injection port 52, an external electrode leading terminal 53, and a pressure relief valve for preventing rupture of the battery when pressure inside the battery is increased. Then, as shown in FIG. 7(B), an injection nozzle 56 of an electrolyte injection apparatus 55 is airtightly mounted on the electrolyte injection port 52 on the top cover 54. An exhaust valve 58 is opened by operating exhaust means 57 of the electrolyte injection apparatus 55, and the air inside the battery case is withdrawn to produce a predetermined degree of reduced pressure. A predetermined quantity of electrolyte 60 is injected into an electrolyte pot 62 via an electrolyte feeding valve 61 from the electrolyte feeding means 59. After the predetermined quantity of electrolyte has been injected, the electrolyte feeding valve 61 is closed.

Next, as shown in FIG. 7(C), the exhaust valve 58 is closed and an electrolyte injection valve 63 is opened. Then, the electrolyte in the electrolyte pot 62 is injected into the battery case due to pressure difference between the air pressure in the battery case and the atmospheric pressure applied on a vent hole 64 on the electrolyte pot. After the electrolyte has been injected into the battery case, a metal piece is attached on the electrolyte injection port, and the injection port is sealed by welding.

The battery element to be accommodated in the battery case is produced as follows: In case of a lithium ion secondary battery, a negative electrode material made of carbonaceous material, on which lithium can be doped or undoped, is coated on a current collector, and a negative electrode is prepared. A positive electrode material of lithium transition metal composite oxide such as lithium cobaltate, lithium manganate, etc. is coated on a band-like current collector, and a positive electrode is prepared. These negative and positive electrodes are bound together with a separator interposed between them and this is wound up, and a battery element is prepared.

In the battery case where the battery element is accommodated, there are a great number of small voids. Even when the air inside the battery case is withdrawn, it takes long time to completely withdraw the air from these small voids. Also, much time is required until the injected nonaqueous electrolyte permeates into the battery element, and it is difficult to inject the electrolyte within short time. The predetermined quantity of electrolyte must be injected to each individual battery. For the purpose of achieving mass production of the battery, it is necessary to arrange many injection apparatuses.

JP-A-07099050 proposes the following apparatus: A battery where electrolyte is to be injected is placed in a chamber. After a predetermined quantity of electrolyte has been filled in a battery liquid pool mounted on the injection nozzle, pressure inside the chamber is reduced, and after removing gas such as the air in the electrolyte or the battery element, the pressure is restored to the atmospheric pressure. Then, pressure is applied further to inject the electrolyte.

In this apparatus, the battery, into which electrolyte is to be injected, is assembled before the top cover is mounted on the top opening of the battery case. In this respect, this cannot be applied to the case where an electrolyte with high viscosity is injected through a small electrolyte injection port of less than 1 mm in diameter as in the case of a small rectangular battery.

It is an object of the present invention to provide an apparatus for injecting liquid into a container, which is entirely sealed except an injection port. In particular, it is an object of the invention to provide an apparatus for injecting electrolyte through an electrolyte injection port into a battery case of nonaqueous electrolyte battery such as lithium ion battery. Also, it is an object of the present invention to provide an apparatus and a method for injecting liquid into many batteries at the same time.

SUMMARY OF THE INVENTION

The above objects can be attained by a liquid injection apparatus for injecting liquid into a container, comprising an injection chamber, a container for a liquid to be injected and entirely sealed except an injection port is placed in the injection chamber with the injection port directed downwardly toward the bottom, an injection cell comprising at least one unit injection cell to accommodate the liquid to be injected is installed in the injection chamber, there is provided pressure regulating means to reduce the pressure in the injection chamber and to regulate pressure in the injection chamber to the atmospheric pressure or to a level higher than the atmospheric pressure, the pressure in the injection chamber is reduced to a level lower than the atmospheric pressure by the pressure regulating means at least once, and then, by maintaining the atmospheric pressure or pressure higher than the atmospheric pressure, the liquid is injected through the injection port.

Further, the present invention provides an apparatus for injecting liquid as described above, wherein the unit injection cell is provided with a recess to receive a projected portion of the container when the container is placed in the unit injection cell with the injection port of the container directed to the bottom.

Also, the present invention provides an apparatus for injecting liquid as described above, wherein a member to form a bottom surface of the unit injection cell and a member to form a side wall surface are connected with each other at a curved junction.

Further, the present invention provides an apparatus for injecting liquid as described above, wherein the liquid Also, the present invention provides a method for injecting liquid into a container, comprising the steps of placing at least one container entirely sealed, except for an injection port, in a unit injection cell of an injection chamber with the liquid to be injected therein, disposing said container in the unit injection cell with the injection port directed to the bottom, reducing pressure in the injection chamber to a predetermined level of pressure, performing at least once an operation to maintain the atmospheric pressure or pressure in the injection chamber higher than the atmospheric pressure for a predetermined period of time and injecting the liquid, and taking out the container to be injected from the unit injection cell.

Further, the present invention provides the method for injecting liquid as described above, wherein said method is a method for injecting electrolyte for a battery.

DESCRIPTION OF THE PREFERRED EMBODIMENT

Figure 1:
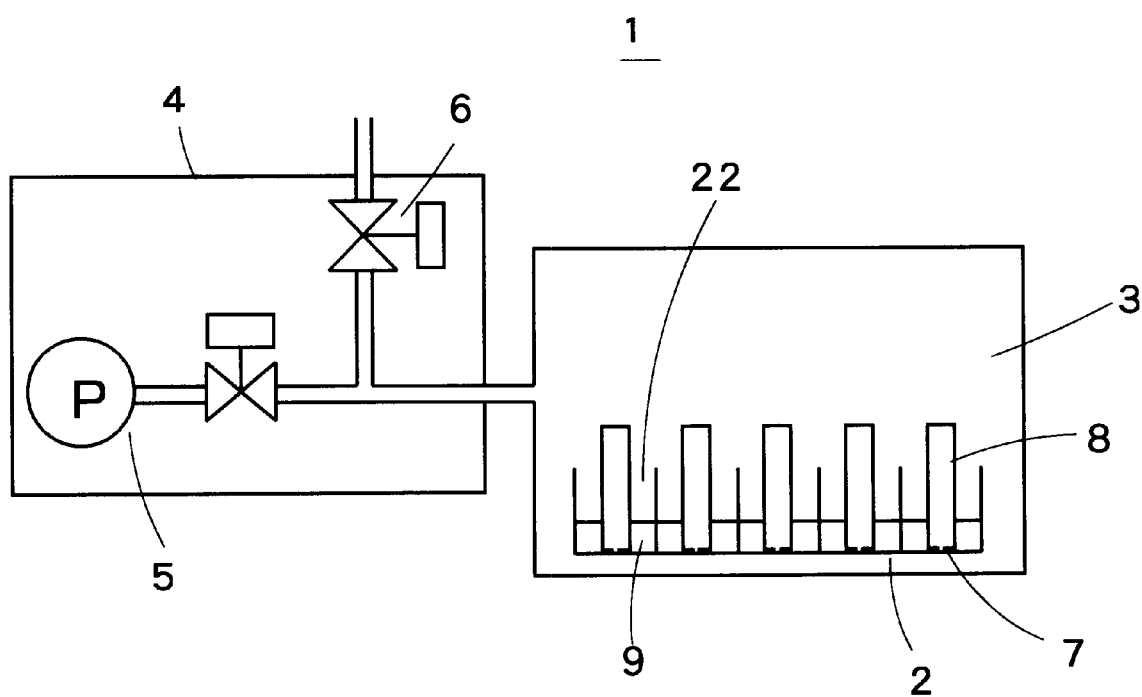
FIG. 1 is a drawing to explain an apparatus for injecting liquid according to the present invention.

When liquid is injected into a container, which is entirely sealed except for an injection port, and if pressure in the container is reduced and pressure higher than the atmospheric pressure is applied, liquid can be injected into the container even when the injection port is directed downward. Further, even when the injection port of a container is directed downward after the liquid has been injected, if cross-sectional area of the injection port is small enough, the liquid injected into the container is not ejected down through the injection port because of surface tension of the liquid. Then, the container can be turned from the condition with the injection port directed downward to a condition with injection port directed upward, and then, the injection port can be sealed. Therefore, the liquid can be easily injected into the container in this case just as the case where the injection port is directed upward.

In the following, the present invention will be described referring to the drawings.

FIG. 1 is a drawing to explain a liquid injection apparatus according to the present invention.

A liquid injection apparatus 1 of the present invention has a liquid injection chamber 3 where an case 2 comprising a plurality of unit injection cells 22 is provided. To the injection chamber 3, pressure regulating means 4 is connected, which can regulate pressure in the injection chamber to any level as desired. The pressure regulating means 4 comprises exhaust means 5 to reduce the pressure inside the injection chamber 3 to a level lower than the atmospheric pressure, and an atmospheric air release valve 6.

To inject the liquid in the liquid injection apparatus of the present invention, a liquid 9 is supplied to each of the unit injection cells 22 in the case 2, which is installed in the injection chamber 3 and comprises a plurality of unit injection cells 22. Then, a container 8 entirely sealed, except for an injection port 7, is placed with the injection port 7 facing to the bottom. Then, the pressure in the injection chamber 3 is reduced by operating the exhaust means 5 of the pressure regulating means 4, and this condition is maintained for a given period of time.

Next, the atmospheric air release valve 6 is opened, and the pressure in the injection chamber 3 is equalized with the atmospheric pressure, and this condition is maintained for a given period of time. Following this, the atmospheric air release valve 6 is closed and the pressure in the injection chamber 3 is further reduced by again operating the exhaust means 5 of the pressure regulating means 4. Then, the atmospheric air release valve 6 is opened, and the pressure in the injection chamber 3 is equalized to the atmospheric pressure, and this condition is maintained for a given period of time. After the liquid has been injected through the injection port 7 to the container 8, the container is withdrawn from the injection chamber. Then, the injection port is directed upward, and the port can be sealed.

It is preferable that due consideration is given on the rate of pressure reduction and the time to maintain the reduced pressure according to properties of the liquid to be injected. In case a highly volatile liquid is contained and volatile substance mixing ratio is changed because of the pressure reduction, it is preferable to open the injection chamber to the atmospheric air immediately when the predetermined degree of reduced pressure is reached.

It is preferable that the procedure to reduce pressure in the injection chamber and to open to the atmospheric air and to maintain under the atmospheric pressure is performed at least two times.

In case the pressure in the injection chamber is reduced two or more times, the degree of reduced pressure on the second pressure reduction, or thereafter, may be set at a level lower than the first pressure reduction. Also, the rate of pressure reduction may be greater than the first pressure reduction.

The injection port may be designed in such size that the liquid may not drop through the injection port when the container is withdrawn from the injection cell, and the size of the injection port is determined according to the size of the container, type of the liquid to be injected, material of the container, etc.

In the present invention, the atmospheric pressure is maintained, and this is because the space inside the apparatus ultimately achieves the atmospheric pressure when the liquid is injected. The container is taken out after the liquid has been injected into it. In this respect, it may be designed in such manner that the pressure may be maintained first at a level lower than the atmospheric pressure, and then it is returned to the atmospheric pressure and the container is withdrawn, i.e. the pressure may be changed in multiple stages.

Figure 2:
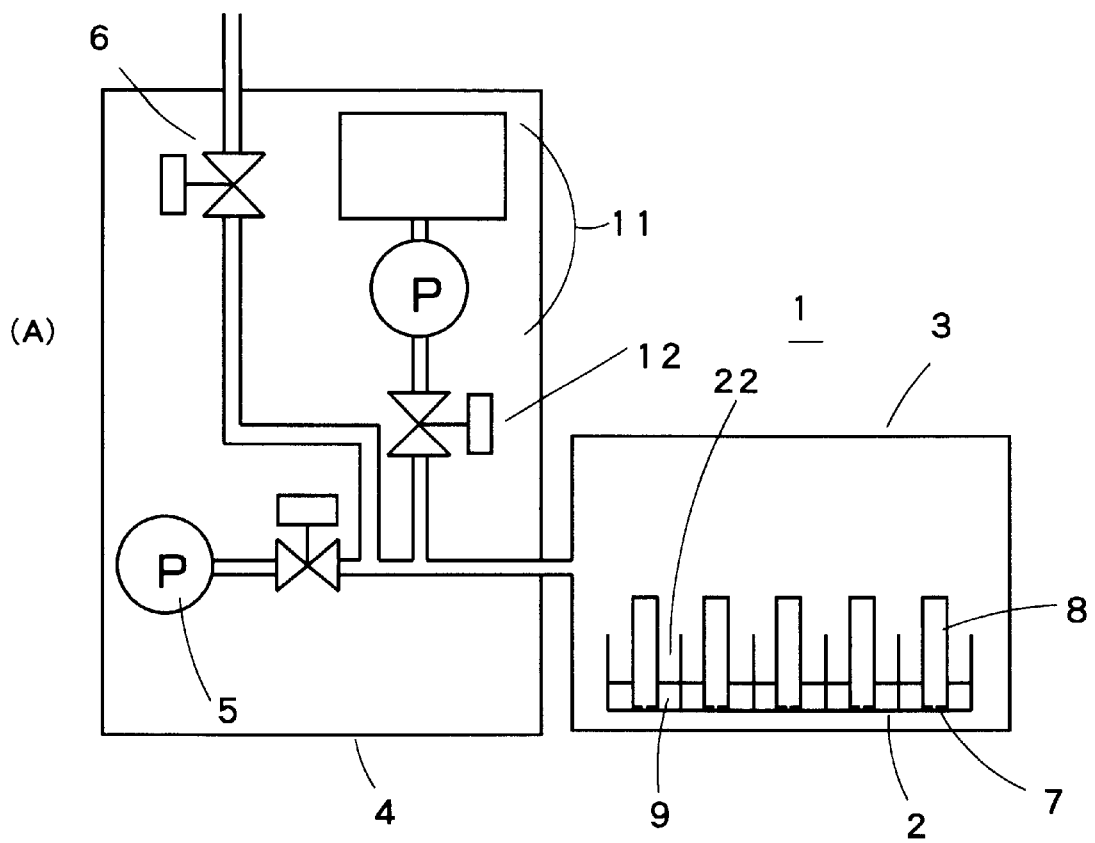
FIGS. 2A and 2B show drawings to explain another example of an apparatus for injecting liquid according to the present invention.
Figure 2:
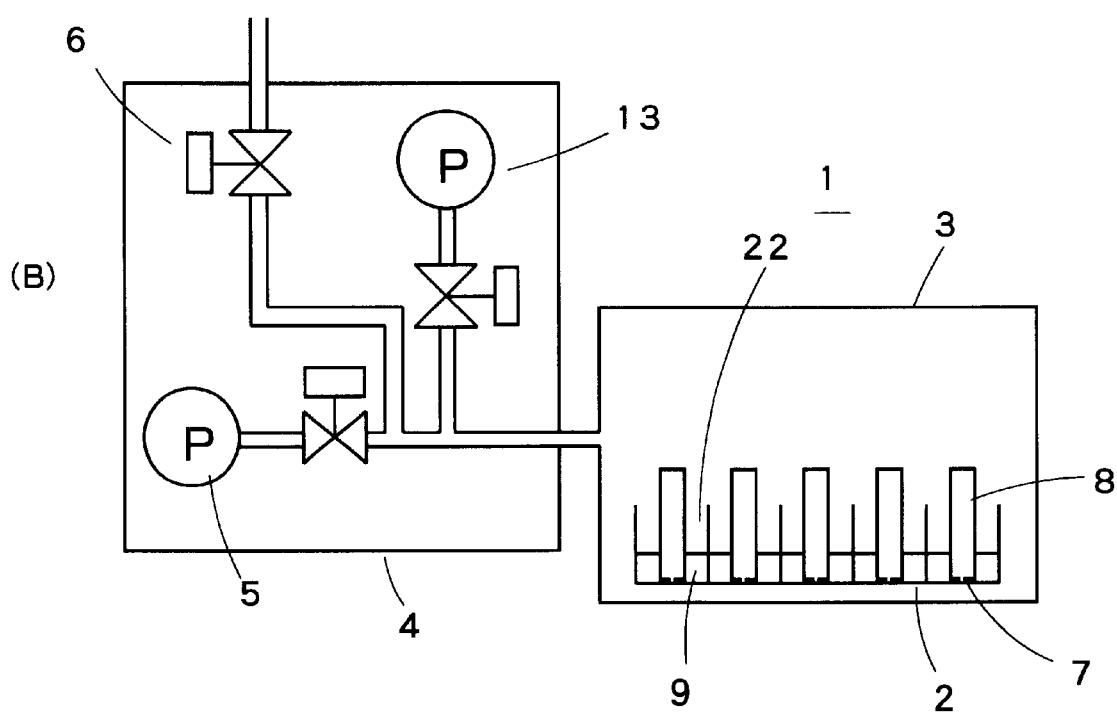

FIG. 2 shows drawings of another type of injection apparatus.

The injection apparatus 1 as shown in FIG. 2(A) has an injection chamber 3 where a case 2 comprising a plurality of unit injection cells 22 is installed. To the injection chamber 3, pressure regulating means 4 to regulate the pressure in the injection chamber to any level as desired is connected. The pressure regulating means 4 comprises exhaust means 5 to reduce the pressure inside the injection chamber 3 to a level lower than the atmospheric pressure, and atmospheric gas feeding means 11. A container 8 entirely sealed except for an injection port 7 is placed, with the injection port 7 directed to the bottom, in a unit injection cell 22 containing a liquid 9 to be injected. Then, the pressure in the injection chamber 3 is reduced by operating the exhaust means 5 of the pressure regulating means 4. After the reduced pressure is maintained for a given period of time, an atmospheric gas feeding valve 12 is opened, and a predetermined atmospheric gas is supplied into the injection chamber 3, and this is maintained for a given period of time. Further, the pressure in the injection chamber 3 is reduced by operating the exhaust means 5 of the pressure regulating means 4, and then, the atmospheric gas feeding valve 12 is opened. The atmospheric gas is supplied into the injection chamber 3, and this condition is maintained for a given period of time. Next, the atmospheric air release valve is opened and the atmospheric gas is replaced with the air. Then, the container is withdrawn from the injection chamber, and after directing the injection port upward, the sealing procedure can be performed.

When this apparatus is used, it is possible to supply gas such as nitrogen, helium, carbon dioxide, etc. by the atmospheric gas feeding means and to form an atmosphere of these gases. Then, the space inside the container can be filled with the atmosphere of these gases, and this may be helpful to solve the problem when the liquid comes into contact with the air.

In particular, when a specific type of gas is used, which can be used for detection of leakage of gas such as helium, the leakage from the container can be detected after the container has been sealed without relying on the method to fill these gases in the container.

The injection apparatus 1 as shown in FIG. 2(B) has an injection chamber 3 where a case 2 comprising a plurality of unit injection cells 22 is installed. To the injection chamber 3, pressure regulating means 4 capable to regulate the pressure in the injection chamber to any level as desired is connected. The pressure regulating means 4 comprises exhaust means 5 to reduce the pressure in the injection chamber 3 to a level lower than the atmospheric pressure, and pressure applying means 13. A container 8, entirely sealed except an injection port 7, is placed, with the injection port 7 directed to the bottom, in each of the unit injection cells 22 with a liquid 9 to be injected in it. Then, the pressure in the injection chamber 3 is reduced by operating the exhaust means 5 of the pressure regulating means 4, and this condition is maintained for a given period of time. Then, the pressure in the injection chamber is maintained at a level higher than the atmospheric pressure by the pressure applying means 13, and this condition is maintained for a given period of time. Further, the procedure to reduce pressure in the injection chamber 3 and to maintain at a given level of pressure may be repeatedly performed. Next, the atmospheric air release valve 6 is opened and the pressure in the injection chamber is equalized with the atmospheric pressure. Then, the injection port is directed upward, and sealing procedure can be carried out.

To the pressure applying means 13 shown in FIG. 2(B), the atmospheric gas feeding means shown in FIG. 2(A) may be connected, and a predetermined atmospheric gas may be supplied under pressure higher than the atmospheric pressure.

As described above, by applying pressure higher than the atmospheric pressure in the injection chamber, it is possible to increase the rate of injection.

Figure 3:
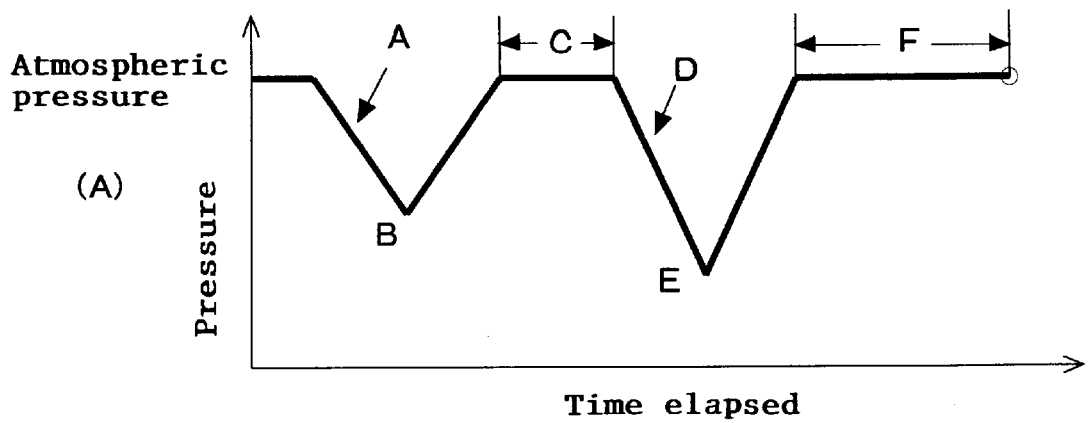
FIGS. 3A and 3B show diagrams to explain an example of the relation between pressure reduction rate and degree of reduced pressure in an injection chamber of an apparatus of the present invention.

FIGS. 3(A) and 3(B) are diagrams to explain an example of the relation between pressure reduction rate and degree of reduced pressure in the injection chamber of the apparatus of the present invention. Pressure is represented on the axis of ordinate, and the time elapsed is shown on the axis of abscissa.

In FIG. 3(A), when the rate of the first pressure reduction shown by A is high, the rate of the gas to be withdrawn from the container is increased. Because of the air bubbles generated, the liquid is very likely to spill out of the container. In this respect, it is necessary to determine the pressure reduction rate by giving due consideration on the factors such as height of wall surface of the unit injection cell.

First, the pressure is reduced to a predetermined degree of reduced pressure B. It is preferable that the degree of reduced pressure B is not lower than vapor pressure of the liquid to be injected up to the temperature at that moment. If the degree of reduced pressure is high, the liquid is turned to boiling state, and the liquid may be lost from the unit injection cell. Next, after a predetermined degree of reduced pressure B has been reached, it is returned to the atmospheric pressure, and the atmospheric pressure is maintained for a given period of time C.

Next, a second pressure reducing operation is performed at a pressure reduction rate D higher than the rate of the first pressure reduction, and pressure is reduced until a predetermined degree of reduced pressure E is reached, which is lower than the degree of the first reduced pressure B. Under this condition, a considerable quantity of the liquid is injected into the container. Therefore, in case of a battery where a separator, active component, etc. susceptible to liquid permeation are present in a battery case, even when the degree of reduced pressure is increased or the rate of pressure reduction is increased, phenomenon such as spilling of he liquid from the unit injection cell does not occur.

After the predetermined degree of reduced pressure E has been reached, the pressure is restored to the atmospheric pressure. After a given period of time F for maintaining the condition has elapsed, the container is taken out.

FIG. 3(B) shows another example. In this case, after pressure is reduced, the condition of reduced pressure is maintained from B1 to B2. Then, the pressure is restored to the atmospheric pressure and this condition is maintained for a given period of time. Then, the pressure is reduced again to the degree of reduced pressure lower than before, and this condition is maintained from E1 to E2.

This method to maintain the reduced pressure for a given period of time is particularly effective in case the injection port is smaller compared with the size of the container, and in case viscosity of the liquid is high.

Figure 4:
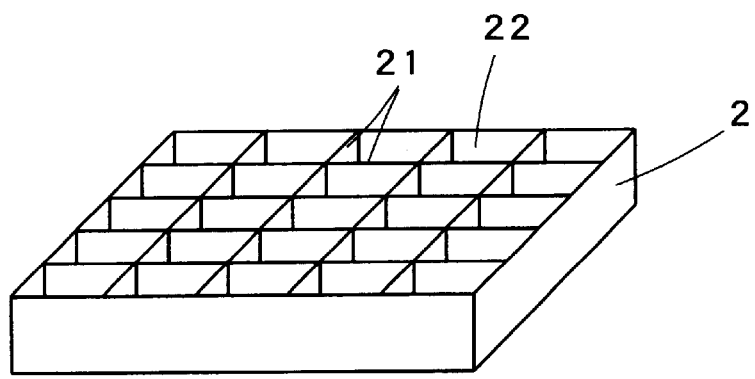
FIG. 4 is a perspective view to explain an injection cell of the present invention.

FIG. 4 is a perspective view to explain an injection cell of the present invention.

It is preferable that the case 2 comprises a plurality of unit injection cells 22 partitioned by partition plates 21 and separated from each other. A plurality of containers may be accommodated in a single case. In this case, the rate of liquid injection into each of the containers in the injection process cannot be maintained at a constant level. This means that it is not possible to maintain the quantity of the liquid to be injected at a constant level because of the condition at the injection port or the contact condition between injection port and wall surface of the case. Therefore, in order to inject the liquid into a plurality of containers at the same time, it is preferable to provide unit injection cells partitioned by the partition plates.

The unit injection cells 22 are formed by each of the partition plates in the case 2, and each of the unit injection cells must be designed in such size that the liquid does not spill out of the container when a predetermined volume of liquid is placed in the container. Also, it must be designed to have such depth that, when the air is withdrawn from the injection chamber and pressure is reduced, and if the gas in the container passes through the liquid and bubbles may be generated in the liquid, the liquid may not be lost from the unit injection cells 22.

Figure 5:
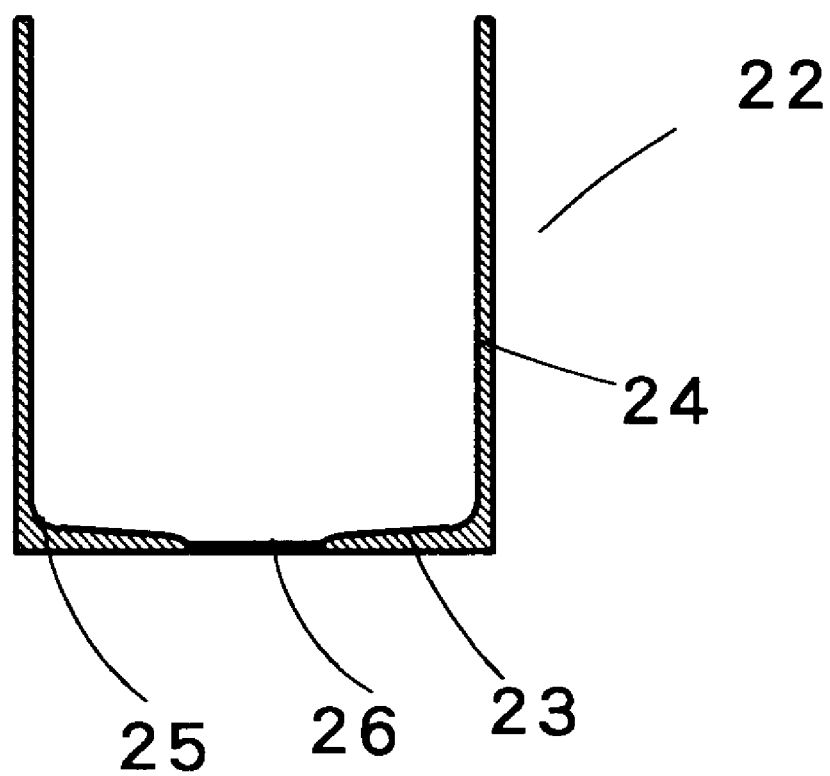
FIGS. 5(A) and 5(B) show drawings to explain an example of a unit injection cell.
Figure 5:
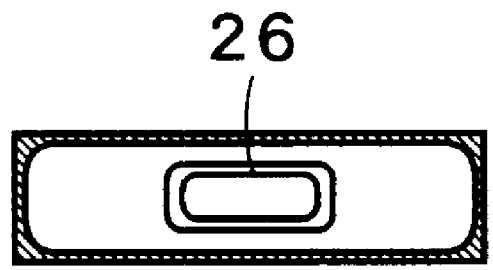

FIGS. 5(A) and 5(B) are the drawings to explain an example of a unit injection cell 22. FIG. 5(A) is a cross-sectional view of the unit injection cell, and FIG. 5 (B) is a plan view.

A bottom 23 of the unit injection cell 22 is preferably tilted down toward the center. It is also preferable that a junction 25 with side wall surface 24 is curved because it is helpful to reduce the remaining quantity of the liquid.

Further, it is preferable that a recess 26 to receive a projected portion of the container is formed at the bottom 23 when the container is accommodated in the cell. By forming the recess, it is possible to ensure the injection of the liquid through the injection port.

It is preferable that the injection cell is made of a material, which has lower wettability to the liquid to be injected. By the use of a material with lower wettability, it is possible to reduce the quantity of the remaining liquid in the injection cell. Also, a stable material with high strength such as metal may be used as a base material of the injection cell, and only inner side of the injection cell may be covered with the material which has lower wettability to the liquid to be injected.

As the material with lower wettability, synthetic resin such as polypropylene, fluororesin, etc. may be used although it depends upon the liquid to be injected. Or, a metal material such as stainless steel may be used as the base material, and the above materials may be coated on it.

In the liquid injection apparatus of the present invention, the liquid to be injected is injected into the case 2 comprising a plurality of unit injection cells 22 using volumetric injection means having a multiple of injection nozzles. Then, a multiple of containers are placed in it. By performing the procedure to reduce pressure and to restore to the atmospheric pressure at least once, a predetermined quantity of liquid can be injected into each of a multiple of containers at the same time.

Figure 6:
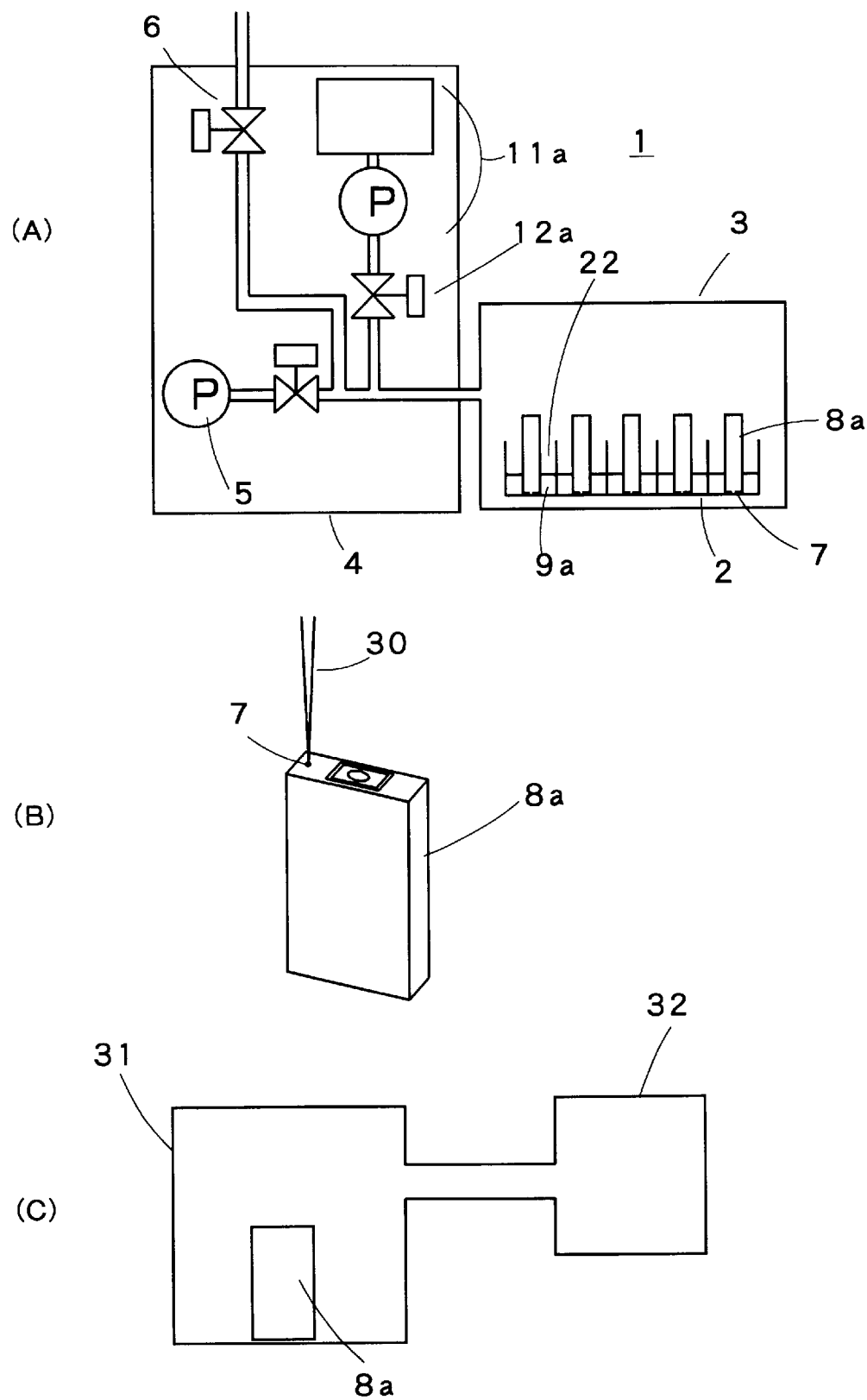
FIGS. 6(A), 6(B) and 6(C) show drawings to explain an example of a battery manufacturing system comprising an injection apparatus of the present invention, a sealing apparatus and leakage detection means.
Figure 7:
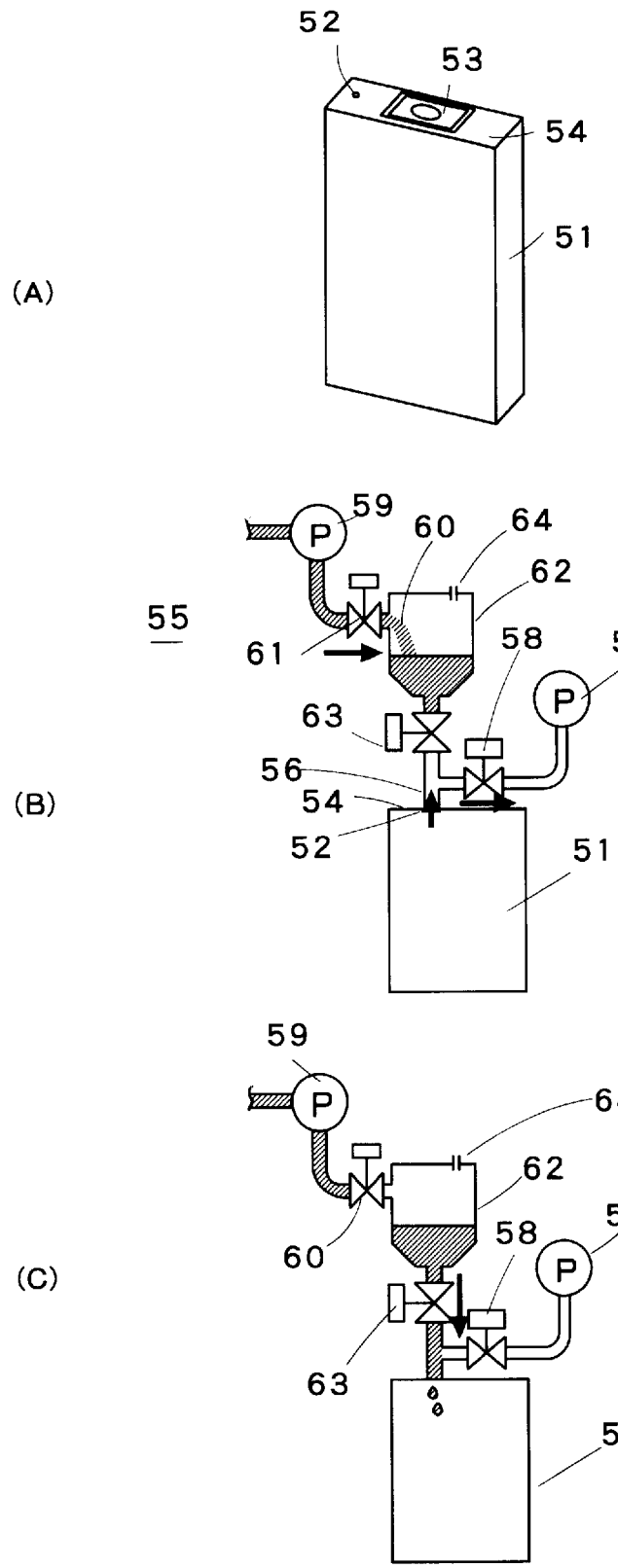
FIGS. 7(A), 7(B) and 7(C) show drawings to explain an assembling process of a battery.

FIGS. 6(A), 6(B) and 6(C) are the drawings to explain an example of a battery manufacturing system comprising the liquid injection apparatus of the present invention, a sealing apparatus, and leakage detection means.

As shown in FIG. 6(A), there is provided an injection chamber 3 where a case 2 comprising a plurality of unit injection cells 22 is installed. To the injection chamber 3, pressure regulating means 4 to regulate the pressure in the injection chamber to any level as desired is connected. The pressure regulating means 4 comprises exhaust means 5 to reduce the pressure in the injection chamber 3 to a level lower than the atmospheric pressure, and helium feeding means 11a. A battery case 8a entirely sealed except an injection port 7 is placed, with the injection port 7 directed to the bottom, in the case 2, which comprises a plurality of unit injection cells 22 each accommodating electrolyte 9a to be injected. Then, the pressure in the injection chamber 3 is reduced by operating exhaust means 5 of the pressure regulating means 4 in the injection chamber 3, and this condition is maintained for a given period of time. Then, a helium feeding valve 12a is opened and helium is supplied into the injection chamber 3, and the condition is maintained for a given period of time. Then, the pressure in the injection chamber 3 is reduced by operating the exhaust means 5 of the pressure regulating means 4, and the helium feeding valve 12b is opened to supply helium into the injection chamber 3, and this condition is maintained for a given period of time. Next, the atmospheric air release valve 6 is opened, and helium is replaced with the air, and the battery case 8a is withdrawn from the injection chamber.

Next, as shown in FIG. 6(B), the injection port is sealed by laser welding means 30. After initial charging of the battery, a leakage detection chamber 31 is installed as shown in FIG. 6(C). Helium concentration is detected by a helium leakage detector 32, and it is possible to detect whether there is leakage from the battery or not.

Embodiment

In the following, description will be given on the present invention referring to an example.

EXAMPLE 1

A battery element was placed through a top opening into a battery case in size of 34×65×10 (length×height×width). Then, a battery header comprising an electrode leading terminal and an electrolyte injection port of 1.0 mm in diameter was mounted, and the opening of the battery case was entirely sealed except the electrolyte injection port.

A unit injection cell was prepared with inner space in size of 50×42×12 (length×height×width), and it was provided with an electrode leading terminal of 0.8 mm in depth. Into the unit injection cell, 6.15 g of an electrolyte containing diethyl carbonate (DEC), ethylene carbonate (EC), and lithium phosphate hexafluoride ($LiPF_6$) was placed. The battery case was placed in it with the electrolyte injection port directed to the bottom, and this was installed in the injection chamber. The air in the injection chamber was withdrawn and pressure was reduced to 0.02 Mpa. Then, the pressure relief valve on the injection chamber was opened, and it was maintained under the atmospheric pressure for 5 minutes. Next, pressure was reduced to 0.005 Mpa, and the pressure of 0.005 Mpa was maintained for 4 minutes. Then, the pressure relief valve of the injection chamber was opened, and this condition was maintained for 15 minutes, and the battery case was taken out. The electrolyte was not ejected through the electrolyte injection port of the battery case.

Electrolyte was injected into 100 battery cases at the same time. The quantity of electrolyte remaining in each unit injection cell was 0.08 g in average, and the quantity of the electrolyte attached on outer side of the battery was 0.06 g in average. Average quantity of 6.01 g of electrolyte could be injected into the battery case.

By the injection apparatus of the present invention, liquid can be injected into a great number of containers in a single process, and this contributes to the improvement of productivity compared with the conventional method to inject liquid into each of the containers one after another.

What is claimed is:

1. A liquid electrolyte injection apparatus for injecting electrolyte liquid into a battery, comprising an injection chamber, a battery for the liquid electrolyte to be injected and entirely sealed, except an injection port, said battery is placed in the injection chamber with the injection port directed to the bottom, an injection cell comprising at least one unit injection cell to accommodate the liquid electrolyte to be injected is installed in the injection chamber, there is provided pressure regulating means to reduce the pressure in the injection chamber and to regulate pressure in the injection chamber to the atmospheric pressure or to a level higher than the atmospheric pressure, the pressure in the injection chamber is reduced to a level lower than the atmospheric pressure by the pressure regulating means at least once, and then, by maintaining the atmospheric pressure or pressure higher than the atmospheric pressure, the liquid electrolyte is injected through the injection port.

2. A liquid electrolyte injection apparatus according to claim 1, wherein the unit injection cell is provided with a recess to receive a projected portion of the battery when the battery is placed in the unit injection cell with the injection port of the battery directed to the bottom.

3. A liquid electrolyte injection apparatus according to claim 1 or 2, wherein a member to form bottom surface of the unit injection cell and a member to form side wall surface are connected with each other at a curved junction.

4. A liquid electrolyte injection apparatus according to claim 1, wherein gas feeding means is connected to the pressure regulating means, and pressure higher than the atmospheric pressure is applied in the injection chamber.

5. A liquid electrolyte injection apparatus according to claim 4, wherein the gas feeding means is feeding means for feeding at least one of nitrogen, carbon dioxide, or rare gas.

6. A method for injecting electrolyte liquid into a battery case, comprising the steps of placing a battery case entirely sealed, except an injection port, in a unit injection cell of an injection chamber comprising at least one unit injection cell with the liquid electrolyte to be injected therein, placing said battery case with the injection port directed to the bottom, reducing pressure in the injection chamber with the injection cells to a predetermined level of pressure, performing, at least once, an operation to maintain the atmospheric pressure or pressure higher than the atmospheric pressure for a predetermined period of time and injecting the liquid electrolyte into the battery case, and taking out the battery case to be injected from the unit injection cell.

7. A method for injecting liquid electrolyte into a battery case according to claim 6, wherein at least one of nitrogen, carbon dioxide or rare gas is supplied into the injection chamber alter pressure reduction, and the atmospheric pressure or pressure higher than the atmospheric pressure is maintained, and space inside the battery case is filled with these gases.

* * * * *